(12) United States Patent
Perpar et al.

(10) Patent No.: US 8,689,725 B2
(45) Date of Patent: Apr. 8, 2014

(54) PROCESS DEVICE FOR COATING PARTICLES

(76) Inventors: Matjaz Perpar, Dragomer (SI); Slavislav Savic, Ljubljana (SI); Matija Gregorka, Radomlje (SI); Rok Dreu, Gradec (SI); Stanko Srcic, Ljubljana (SI); Rok Sibanc, Velenje (SI); Matevz Lustrik, Medvode (SI); Iztok Zun, Ljubljana (SI)

( * ) Notice: Subject to any disclaimer, the term of this patent is extended or adjusted under 35 U.S.C. 154(b) by 33 days.

(21) Appl. No.: 13/132,137

(22) PCT Filed: Dec. 1, 2009

(86) PCT No.: PCT/SI2009/000065
§ 371 (c)(1),
(2), (4) Date: Sep. 7, 2011

(87) PCT Pub. No.: WO2010/065000
PCT Pub. Date: Jun. 10, 2010

(65) Prior Publication Data
US 2011/0315079 A1  Dec. 29, 2011

(30) Foreign Application Priority Data
Dec. 1, 2008 (SI) .................. P-200800295

(51) Int. Cl.
*B05C 5/00* (2006.01)
*B05C 11/06* (2006.01)
*B01J 8/18* (2006.01)
*A23G 3/26* (2006.01)

(52) U.S. Cl.
USPC ................ 118/303; 118/62; 118/19; 118/24; 118/DIG. 5

(58) Field of Classification Search
USPC ............. 118/303, 62, 19, 24, DIG. 5, 63, 64; 422/139, 187, 143, 145, 147; 427/185, 427/213; 239/135
See application file for complete search history.

(56) References Cited

U.S. PATENT DOCUMENTS 6,695,919 B2 * 2/2004 Jones et al. .................... 118/303
6,949,141 B2 * 9/2005 Huttlin .......................... 118/303

* cited by examiner

*Primary Examiner* — Yewebdar Tadesse
(74) *Attorney, Agent, or Firm* — The Watson I.P. Group, PLC; Jovan N. Jovanovic; Vladan M. Vasiljevic (57) ABSTRACT

A process device for coating particles in which, on the inside wall (1), there are one or more units installed. Each unit includes a swirl flow generator (4) around which a straight or curved perforated plate (3) and draft tube (5) are located in cross-section. A single or multi-phase spraying nozzle (6) is installed centrally through the swirl flow generator (4) with a conduit (7) for dispersion for coating and a conduit (8) of compressed air. The swirl flow generator (4) has at an angle from the vertical adjacent grooves (18) that open outwards, with the angle of grooves (18) to the vertical line are between 10 and 45°.

7 Claims, 8 Drawing Sheets

PROCESS DEVICE FOR COATING PARTICLES

The subject of the invention is a process device for coating particles that falls within the field of chemical and pharmaceutical technology. It represents an improvement on the process equipment for coating particles by spraying from the bottom and works on the principle of fluidization technology. More specifically, the invention relates to the design solutions of the essential elements of the coating device that improve the quality of the coating. The invention belongs to the A61J3/06 class of international patent classification.

The technical problem successfully addressed by the submitted invention is to effectively provide a narrow distribution of coat thickness from particle to particle even when coating small particles (50-300 microns). Coating particles with functional coat is a common technological process in the chemical and pharmaceutical industries. Especially in the case of pharmaceutical products, which show a prolonged release of medicinal active ingredients for which the dissolution rate of the medicinal active ingredient is defined by the diffusion through the coat, the coating thickness and the uniformity of the coating thickness from particle to particle is of crucial importance for achieving the planned active ingredient release kinetics. Providing narrow coating thickness distribution from particle to particle by exploiting the construction of the processing equipment is also important in the case where with the particle coating protects them from atmospheric, physiological, or other environments. In this case we can apply less substance to the particles in order to achieve functional coating; while at the same time reduce the time and energy consumption for the technological process. The problem is also in coating smaller particles (50-300 microns), which due to their low weight and inertia are more prone to the undesired agglomeration process. Independent and coated fine particles are important in the pharmaceutical and chemical technology due to the increased specific surface area as compared to larger particles. In the pharmaceutical industry, in the case of coating particles with dispersion containing a medicinal active ingredient it is particularly important to maximize the coating efficiency, which is usually the function of the position and orientation of the nozzles and volume fraction of particles around the spray nozzle.

Known process devices for coating particles, which operate on the principle of fluidization technology, are appropriate technology for coating particles in the size range from 50 microns to 6 mm.

Process devices for coating particles acting on the principle of fluidization technology, are roughly divided into devices that spray from top, devices with tangential spraying, and devices that spray from bottom.

Process devices that spray from top are primarily intended for granulation, while in the case of coating the effect of spray drying is more strongly expressed, due to the need to obtain small droplets of dispersion for coating. If we lower the position of the nozzle, the path of the droplets to the particles does reduce, but the opposite flow of air for fluidization and the compressed air from the two-channel nozzle, results in interference to the particle flow pattern and excessive wetting of the mesh at the bottom of the device.

Process devices with tangential dispersion in combination with a rotor disc are problematic in terms of close contact of particles in the flow pattern and the relatively small heat flux through the processing chamber, resulting in facilitation of agglomeration of small particles that we want to coat.

In the case of a process device with bottom spraying, the distance between the spraying nozzle and the particles is short, and the nozzle is oriented in the direction of fluidizing airflow and flow of the particles.

The derivative of bottom spray process device is known, which contains, the so called inner or draft tube, positioned centrally above the nozzle and the distribution plate. With the inclusion of the draft tube, the processing chamber acquires the nature of a device that operates on the principle of fluidization technology with circular movement (circulating fluid bed), which is named, after its inventor, as the Wurster chamber. The advantage of this device is that the area of particle coating is separated from the drying area, furthermore, due to the pneumatic transport of particles within the draft tube and in vicinity of the nozzle, the speed of the particles is relatively large (0.7-2 m/s), which reduces the possibility of agglomeration of particles. The shape of the particle movement is circular and repetitive, which represents a form of controlled movement. The problems with coating using a classic Wurster chamber are reflected in the non-uniformity of the film coatings within the particle population, which is a consequence of the particle mutual shading effect of in the area of spraying of the coating dispersion, the effect of the 'dead spot' in the flow of particles, and the result of disproportionate acceleration of the smallest and largest particles in the particle population we are coating. The volume fraction of pellets in the coating area, and with it the degree of the particle mutual shading effect depends on the flow of the fluidization medium (air or inert gas), and on the set height of the draft tube. The effect of the 'dead spot' in the particle flow occurs in the corner between the outer wall of the process device and the distribution plate, as the particles that are located nearer to the outer wall of the draft tube come faster to the area of horizontal transport and then coating and vertical transport area, and thus circle several times more through the draft tube during coating and consequently receive more coat. The effect of the 'dead spot' is more strongly pronounced at the lower positions of the draft tube, in spite of larger openings in 'dead spot' area of distribution plate, which should with the larger local vertical airflow, decrease or eliminate this problem. If we coat a particle population with a broader size distribution, the larger particles have a thicker coat at the end of the coating than those, which are smaller. This happens because of the nature of vertical transport of particles, since smaller particles have a better relationship between their cross-section and mass than the larger particles. Consequently, smaller particles will gain greater speed than the larger particles and rise higher after passing the draft tube, resulting in an increased time for rising and falling of smaller particles in the processing chamber as opposed to larger particles. In the overall coating time this fact expresses in the dependence of the number of particle crossings through the draft tube from the initial particle size.

Furthermore, due to the relatively high density of particles at the inner wall of the draft tube and with it, inter-particle collisions, the agglomeration of particles can be expressed in the size range of 50 to 300 microns, despite of relatively fast drying, due to the large local flow of heated air.

Known solutions to the Wurster device problems are discussed in continuation.

It is known that the swirl flow within a tube improves the heat transfer in a two-phase flow as a result of a longer fluid path (and thus the time of contact with particles) at a distance in the axial flow direction (Algifri A H et al, Heat-transfer and turbulent decaying swirl flow in a circular pipe, International Journal of Heat and Mass Transfer, 1988, 31 (8): 1563-1568.). Due to the better heat transfer, it is expected that the problem with coating smaller particles is reduced.

The article on improving thermal efficiency in drying in a device that does not have the structure of a Wurster device, but it operates on the principle of fluidization technology and has a swirl flow generator in the form of a vane. With the inclusion of the swirl flow in this device, 5 to 25% improvement in terms of drying speed and specific drying speed was achieved, and up to 38% improvement of drying effectiveness (M. Özbey, MS Söylemez, Energy Conversion and Management, 46, (2005), 1495-1512).

By including the swirl flow in the Wurster chamber, the width of the coating thickness distribution is reduced in the population of coated particles with a narrow distribution size by about 43% (P W S Heng et al., International Journal of Pharmaceutics, 327, 2006, 26-35). When compared with the conventional Wurster chamber, the occurrence of agglomeration is also substantially reduced (E S K Tang et al., International Journal of Pharmaceutics, 350, 2008, 172-180), while the coating efficiency when compared with a conventional chamber for a given derivative is somewhat poorer.

With the inclusion of additional sources of airflow in a horizontal position in the direct proximity of the distribution plate and in a radial direction (U.S. Pat. No. 6,579,365 B1, U.S. 2008/0000419 A1) or in a tangential direction—chordal (U.S. Pat. No. 4,035,152), to the outer edge of the distribution plate. The additional local airflow sources are powered by pressure or from the main airflow for fluidization.

The purpose of the additional sources of air is the elimination of the 'dead spot' in the particle flow, and consequently, the improvement of the distribution of the film coating thickness within the coated particles population.

In the U.S. Pat. No. 5,718,764 (swirl flow) the solution of the Aeromatic Company is described, which used and protected the swirl flow generator within the device for coating with spraying from bottom (Wurster chamber). In their examples, the latter demonstrated a defined improvement in the uniformity of film coatings, assessed indirectly through the effect of colour dissolution from a coated core through a more or less continuous insoluble coating. Given that the effect of swirl flow on heat transfer was already known (Algifri A H et al, Heat-transfer and turbulent decaying swirl flow in a circular pipe, International Journal of Heat and Mass Transfer, 1988, 31 (8): 1563-1568.), in the present document an own construction for achieving swirl airflow is described.

In the U.S. Pat. No. 6,492,024 B1 (granulation with swirl flow) the process of granulation in combination with a device for coating with a swirl flow generator from U.S. Pat. No. 5,718,764 is described.

U.S. Pat. No. 6,579,365 B1 describes a number of improvements of the device for coating with a view to achieving better distribution of coating in the particle population, particularly with the introduction of pressure powered radially oriented orifices just above the distribution plate and/or slot in the wall of the device, which is in general parallel to the distribution plate and is in direct proximity to the distribution plate. A similar solution is described by the U.S. Pat. No. 4,035,152, which also contains pressure-powered orifices in the same area of an equivalent process device for coating.

There is a constant need for particle coating process equipment, which will when compared to the existing functional-structural solutions of the Wurster device ensure an effective particle coating process. The result of which will be a population of coated particles with a comparatively narrower distribution of film coating thickness, less agglomeration of particles, increased coating yield, and lower dependence of the coating thickness to the initial particle diameter in a population of particles with a wider initial distribution of particle sizes.

In the presented invention, we have solved the technical problem of reducing the width in distribution of film coating thickness, of reducing the agglomeration of particles, and increasing the coating yield, with an innovative construction of the swirl airflow generator (FIG. 5), which gives a different profile of air speed at entry into the bottom part of the draft tube as is the characteristic of currently known implementations of swirl flow. The reduction of the RSD of the film coating thickness is also greater in comparison with the known implementation, namely by 56 to 62% reduction against the conventional Wurster chamber, compared to 43% reduction against the conventional Wurster chamber (P W S Heng et al., International Journal of Pharmaceutics, 327, 2006, 26-35). We have also reduced the problem of the dependence of the film coating thickness to the initial particle size we are coating with an innovative design.

We have also solved the technical problem of reducing the distribution width of film coating thickness with the introduction of pressure-powered vertical slots (27) and horizontal circumferential slot (24) with an inclination, where we were able to achieve 46% reduction in the RSD against a conventional Wurster chamber.

The invention will be further explained based on the implementation examples and appurtenant figures, each of which shows.

Figure 1:
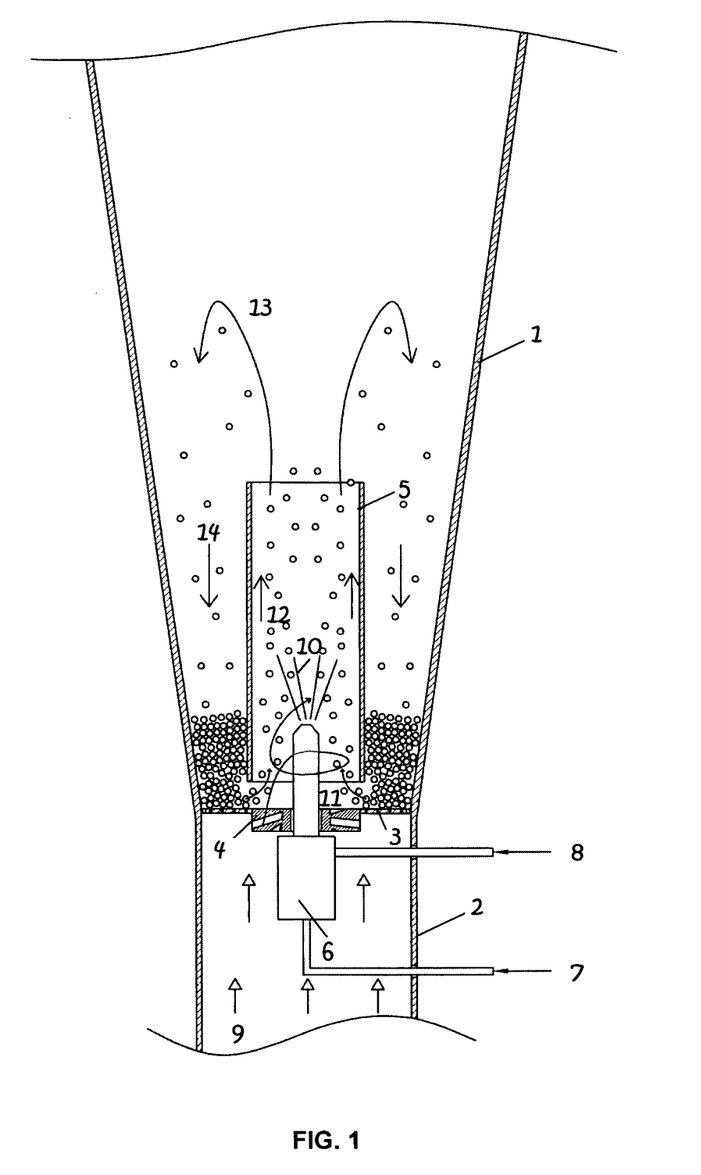
FIG. 1 The schematic cross section of the process device for coating particles according to the invention.

FIG. 1 presents a schematic cross section of process device for coating particles consisting of the outer wall (1), which at the bottom of the device has the shape of a cylinder, or truncated cone. At the bottom of process device, where the particles we are coating dwell during the process, is the swirl flow generator (4) with the perforated plate (3) in the outer area, by the wall (1) of the device. The perforated plate (3), which from the floor plan is ring shaped, can be straight or curved in the cross section. Just above the perforated plate (3) and the swirl flow generator (4) is woven metal mesh with row gaps of 20 to 40 microns. The coating dispersion spraying nozzle (6), which can be a single or multiphase type, is introduced centrally through swirl flow generator (4). According to FIG. 1, the two-channel nozzle (6) for spraying has conduit (7) for coating dispersion, and conduit (8) for compressed air. Due to the acceleration of compressed air at the end of nozzle (6) for spraying and consequently the resulting shear stresses, a cloud (10) of dispersion droplets for coating is formed in the form of a full or hollow cone, which represents a narrower area of particle coating. Below the perforated plate (3) and swirl flow generator (4), the wall (2) of the process device forms space in which we supply medium (9) (usually air) for fluidization and it is in this part of the device that is in positive pressure with regard to the area of the process device above the swirl flow generator (4) and perforated plate (3). The draft tube (5) is clamped centrally in the processing chamber in the form of a tube at such a height that it forms a gap (usually from 5 to 25 mm in size) with the swirl flow generator (4) with the perforated plate (3). Particles are in the serial implementation of the process device positioned in the form of a layer around the draft tube (5) above the flat or curved perforated plate (3). It depends on the number of and arrangement of orifices in the outer perforated plate (3), the flow of medium (9) for fluidization, the size and density of particles whether that layer is in the form of a static, loose bed or fluidized state. The centrally located swirl flow generator (4) for medium (air) forms in the area of draft tube (5) horizontal cross-section a swirling flow (17) of air with an axial and tangential component. The swirling flow (17) of air creates a negative pressure in the area of the gap between the draft tube (5) and the outer perforated plate (3) due to the large local variations in the air speed, which results in horizontal suction of particles (11) in the area of the gap. Because of the sufficiently large axial and tangential air velocity, the particles from the swirl flow generator (4) level rise vertically in the direction of the arrow (12) along the draft tube (5) in which they partially follow the movement of air in the form of a swirl due to the tangential component of airflow. During the vertical movement of particles upwards, they fly through the area (10) of coating dispersion spray around the nozzle. In this area (10) random collisions of particles and droplets occur, at which a drop after the collision distributes along the surface of particle in accordance with the contact angle with a given solid. Part of the drop can penetrate to the interior of the particles, which occurs particularly at the beginning of the process of coating. If the number of collisions of particles and drops are sufficient, the droplets can coalesce in the form of a film. As the air stream (17) for fluidization is heated (usually at 40 to 80° C.) before entering the processing chamber, and is in good contact with the solid particles, there is an effective evaporation of the solvent of the coating dispersions from the surface of particles (water or an acceptable organic solvent). The surface wetted particle dries quickly enough that on accidental collision with other particle the formation of a liquid bridge and potential agglomerate is avoided. If the density of particles around the nozzle (6) is too small, the effect of spray drying or the coating of the inner wall of the draft tube (5) can occur, both of which reduce the coating process yield. Particles along the entire tube (5) accelerate, but when leaving the tube (5), their speed begins to reduce, as the local air velocity quickly falls due to the rapid increase of this section of the process device, as well as the particle drag force in the air stream. After reaching their maximum height in the expansion part (13) of the process devices, the particles fall back between the outer wall of the draft tube (5) and the wall (1) of the process device until they reach the level of the particle bed at the bottom of the device. During the upward and downward movement of the particles, the process of drying is continuously in operation so that when the particle gets in contact with particle bed it is practically dried. With the balance of the coating dispersion spray rate, managing the droplet size through the spraying pressure, and size of the heat flow controlled through the flow and temperature of the medium for fluidization, we create conditions during the process of coating that favour the process of coating and not the agglomeration of particles. During coating, the particles depict repeating circular movement in the chamber and so pass the coating area many times. Thus, with time the coating at first forms a continuous film over the surface of the particle, whose thickness increases during further coating.

Figure 2:
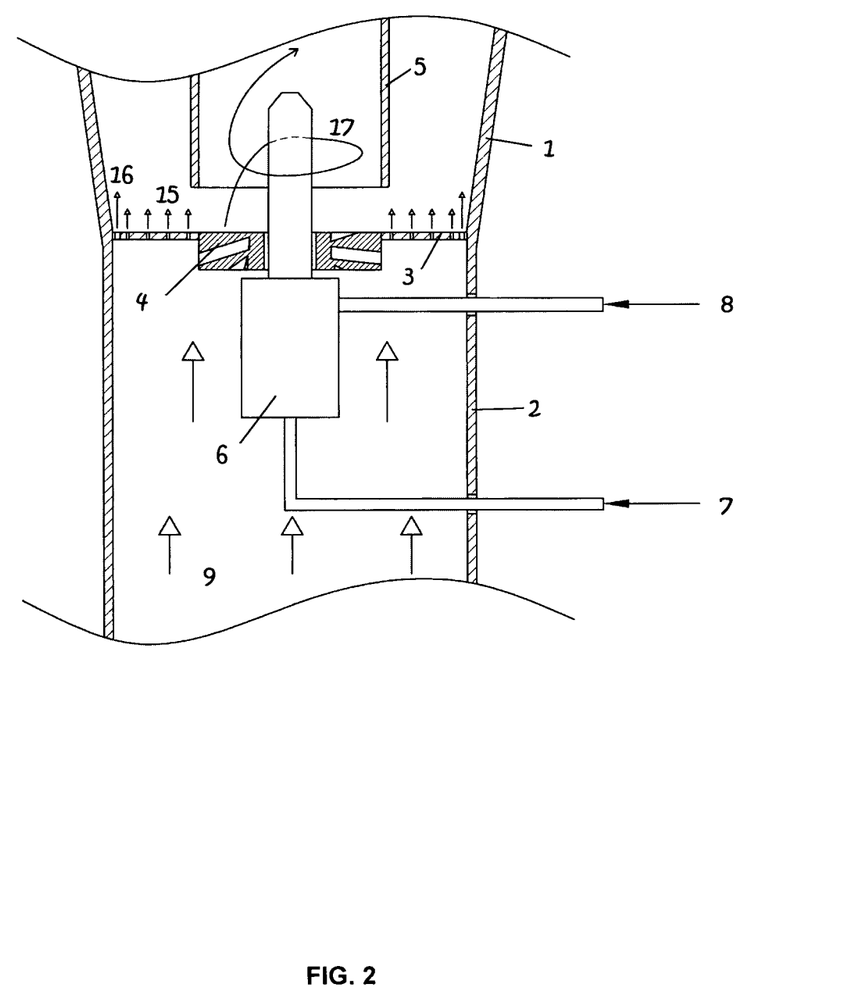
FIG. 2 A detail of the process device in the vicinity of the swirl flow generator.

FIG. 2 shows a detail of the process device in the vicinity of the swirl flow generator (4) and spraying nozzle (6) for distribution and the shape of the local flows (15), (16), (17) of medium (air) for fluidization. The typical layout of an orifice density and cross-section on the outer perforated plate (3) is also shown. In the area of the perforated plate (3) along the wall (1) of the process device, a band of orifices of larger cross-section is located, which generates greater local air flow (16) than is the case for air flow (15) of the remaining orifices of the perforated plate (3). In this way, the effect of particles dwelling in the corner between the perforated plate (3) and the wall (1) of the process device is reduced.

Figure 3:
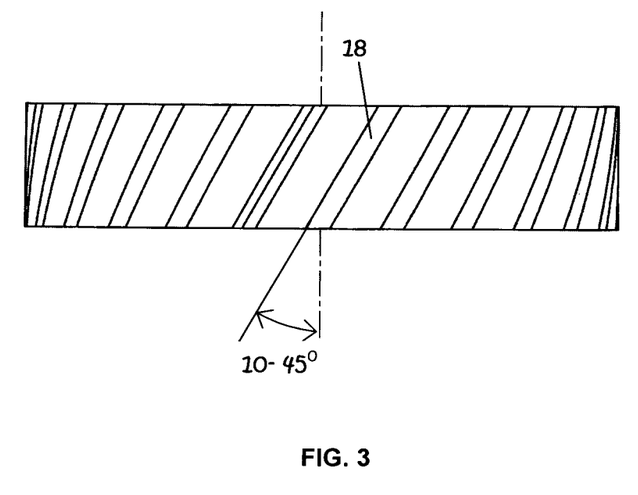
FIG. 3, 4, 5 The geometry of the swirl flow generator (4).
Figure 4:
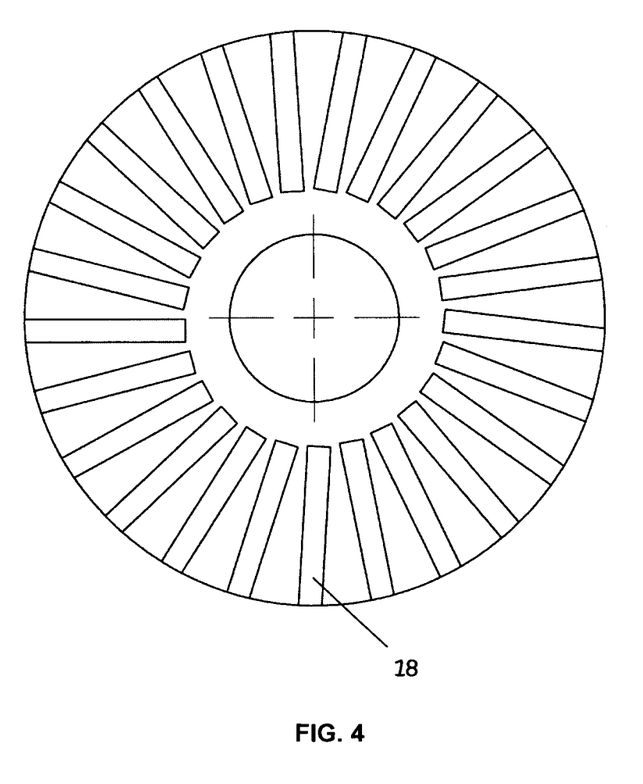
Figure 5:
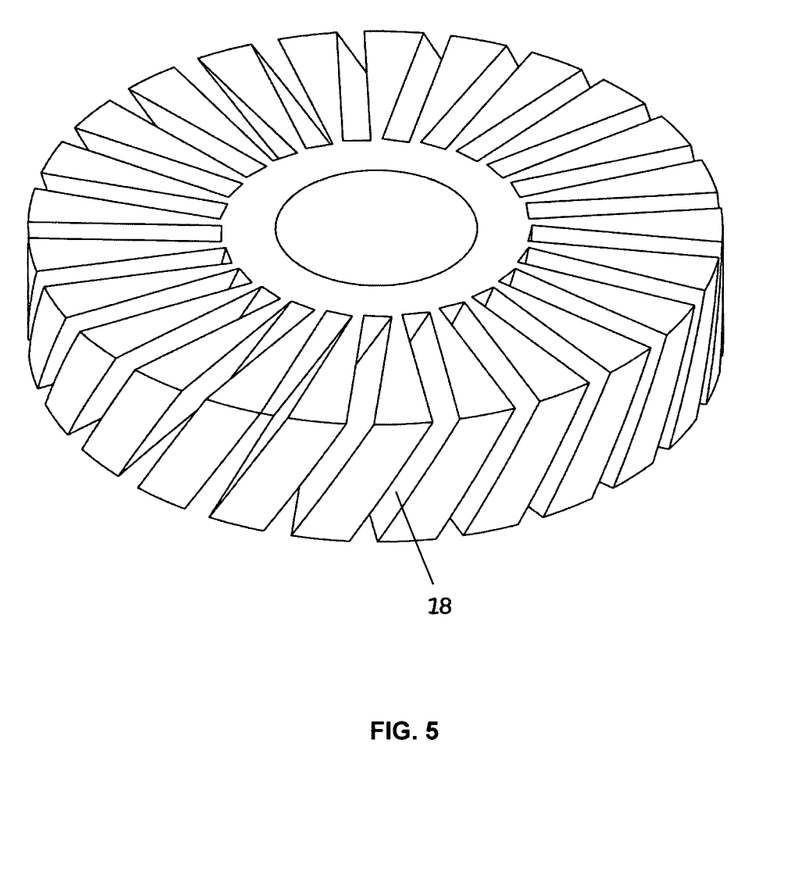

In FIGS. 3, 4 and 5 the geometry of the swirl flow generator (4) is shown. The swirl flow generator (4) diverts air into a vortex, which is the result of the inclination of the grooves (18) (most often, the grooves (18) form an angle of 30° to the vertical line or in interval between 10 and 45°) in the generator (4). The total floor area of the grooves (18) of the swirl flow generator (4) is from 20 to 50% of the horizontal cross section of draft tube (5) surface area. The diameter of the swirl flow generator (4) is from 65 to 100% of the diameter of the draft tube (5). The fact that the grooves (18) of the generator (4) are open to the outside (they have no walls at the periphery of the generator (4)) is of key importance, since this causes the distribution of airflow with an increased flow centrally along the side of the spraying nozzle (6) and a reduced airflow externally to the radius, which corresponds to the radius of the draft tube (5). If the airflow in the lower transverse cross-section of the draft tube (5) has the distribution of speed as described above, then this distribution homogenises on the upper transverse cross-section of the draft tube (5). Due to the generated shape and characteristics of the swirl flow of air through the draft tube, there is less opportunity for the recirculation of particles in the lower part of the draft tube (5) and gap, resulting in lower potential for particle agglomeration because of over-wetting and the reduced variability in thickness of film coatings.

During a potential installment of a peripheral wall of grooves (18), the generated swirl would due to its initial homogeneity in the distribution of air velocity along the radius of the generator through centrifugal air force and the immediate expansion of the air vortex after passing through the generator (4), push aside particles from the gap between the draft tube (5) and distribution plate (3), and thus disrupt the suction of particles into the area of horizontal traction (11).

The swirl flow generator (4) reduces the RSD of coating thickness (implementation example 1) in such a way that the circular movement of particles that follow the stream of air reduces the effect of particle mutual shading. The particles are also more evenly distributed throughout the volume of the inner tube. Due to the higher overall air speed (axial and tangential component), the swirl flow of air is more effective at sucking particles and thus reduces the 'dead spot' effect, which also reduces the RSD of coating thickness. Due to previously described forms of particle movement in the draft tube as a result of swirl airflow the coating yield is increased. Due to the improvement of heat transfer (as a result of the longer path of particle movement on the journey through the draft tube and the expansion area of the device), and the reduction of local density and inter-particle collisions at the wall of the draft tube (5), when compared to the conventional Wurster chamber, we observed in the case of the process device with a swirl flow generator (4) substantially lower agglomeration of particles against the conventional Wurster chamber (implementation examples 3 and 4). Due to the centrifugal component of particle movement smaller particles after passing through the draft tube (5) collide against the wall of the device (1) and fall towards the bottom of the device sooner, which reduces the problem of coating thickness dependence on the initial particle size, which is characteristic for a conventional Wurster chamber (implementation example 5).

Figure 6:
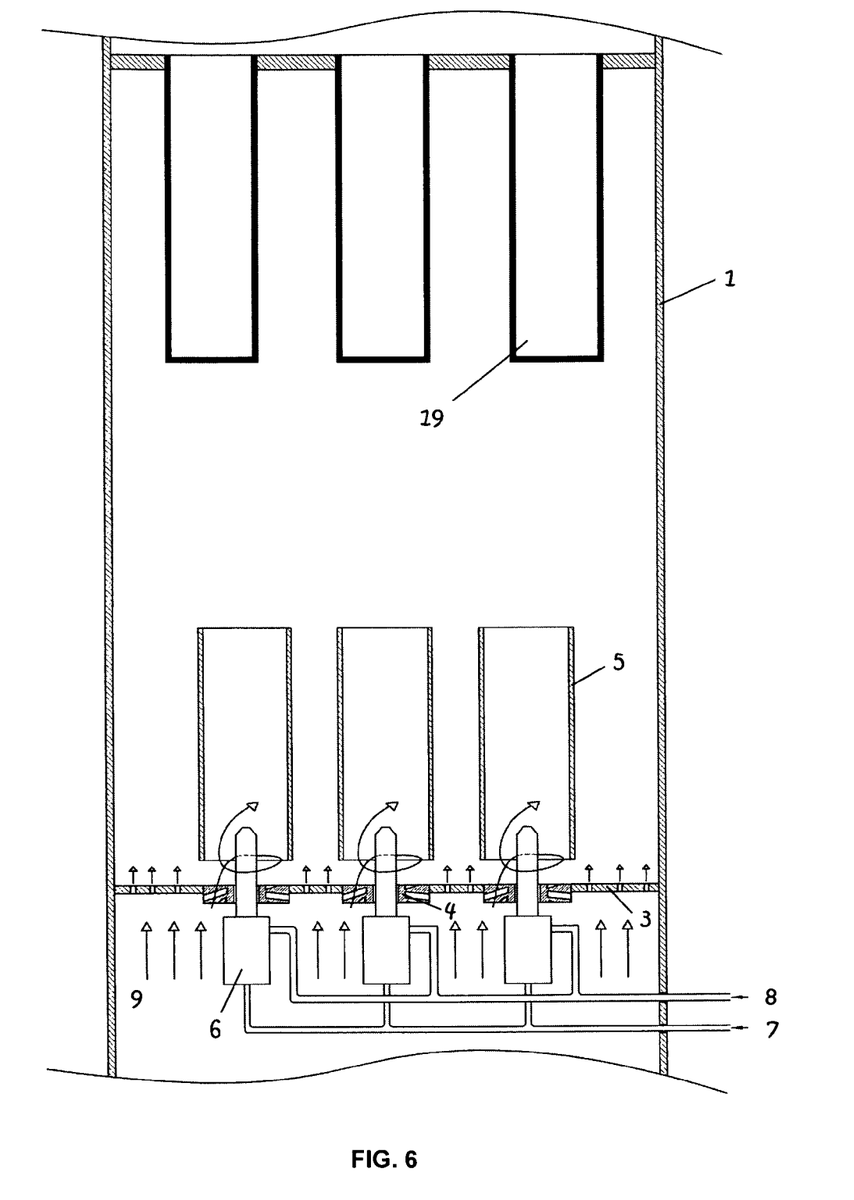
FIG. 6, 7 A schematic implementation of a semi-industrial or industrial device for coating particles according to the invention.
Figure 7:
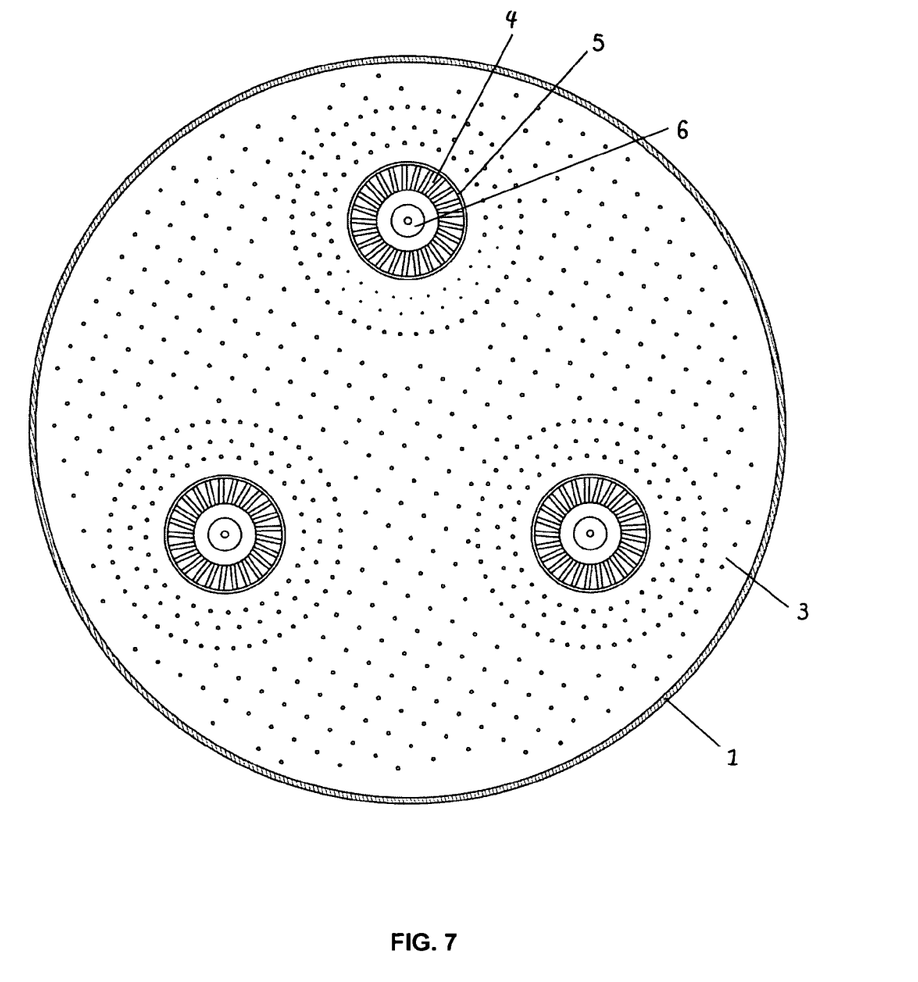

FIGS. 6 and 7 indicate the schematic implementation of semi-industrial or industrial device for coating particles with swirl flow generators (4), where the capacity increase of the process device is made by increasing the number of swirl flow generators (4), spraying nozzles (6), and draft tubes (5) within one process device with filters (19).

Figure 8:
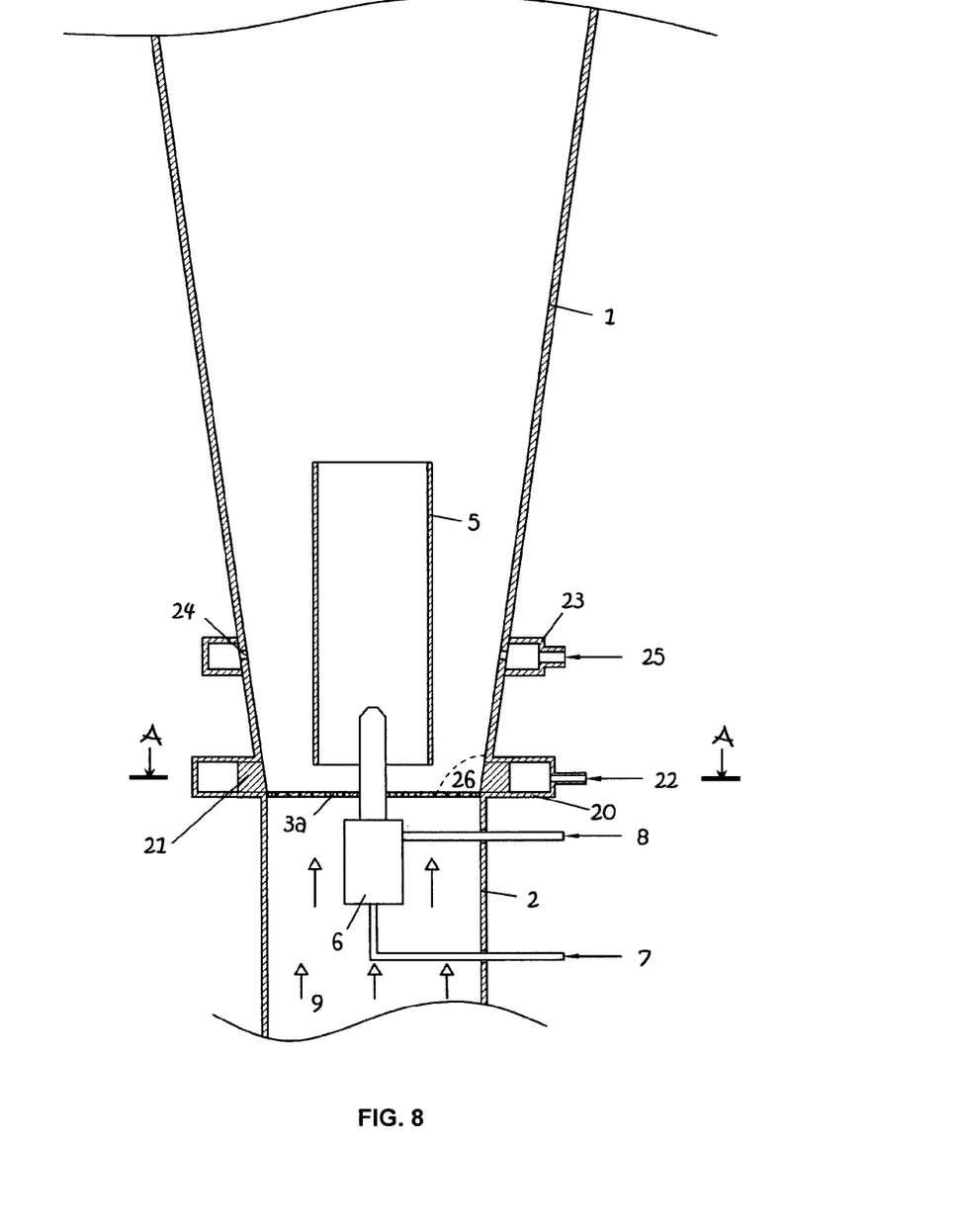
FIG. 8 A schematic cross-section of the processing chamber for coating particles according to the invention with the structure of a conventional Wurster device.

The process device for coating particles in the second implementation example of the invention, as shown in FIG. 8, has inside wall (1), installed one or more units. In which each unit consists of a draft tube (5) and a single or multi-phase spraying nozzle (6), which is mounted centrally with regards to the draft tube (5) and penetrates the perforated plate (3a). The perforated plate (3a) located in the outer part between the wall of the draft tube (5) and the wall (1) of the device is in cross-section straight or curved, and has a typical size distribution of circular orifices with the largest cross-sections in the area of the ground plan projection of draft tube (5) and smaller orifices in the rest of the plate. Just above the perforated plate (3a) is a woven metal mesh with holes of the order 20 to 40 microns. In FIG. 8 is a schematic cross-section of the process device for coating particles with the structure of a conventional Wurster device, where in the area of angle (26) between the wall (1) of the device and the perforated plate (3a) are placed vertical slots (27) with pressure-powered blow and at least 20 millimetres above the perforated plate (3a), the circumferential slot (24) which is directed obliquely at the wall of the draft tube (5) and at the same time radially to the wall of the device (1).

The distribution of orifices of the perforated plate (3a) assures in the vicinity of the nozzle 6 a strong axial air flow along the draft tube (5), which provides a vertical pneumatic transport of particles through the draft tube, while the openings in the outer area of the perforated plate (3a) are intended for loosening or fluidisation of the particle bed and removal of detained particles in the area of the angle (26) between the perforated plate (3a) and the wall (1) of the device. The description of the particle movement and medium for fluidization, heat, and mass transfer during coating in the device from FIG. 8 is similar to the description that applies to the chamber from FIG. 1, except that in this case, there is no swirl air movement in the draft tube (5). The inflow of air through the vertical slots (27) prevents the retention of particles in the angle (26) between the perforated plate (3a) and the wall of the device (1), while the air inflow of the peripheral slots (24) additionally mixes the particles horizontally before sucking them into the draft tube.

Figure 9:
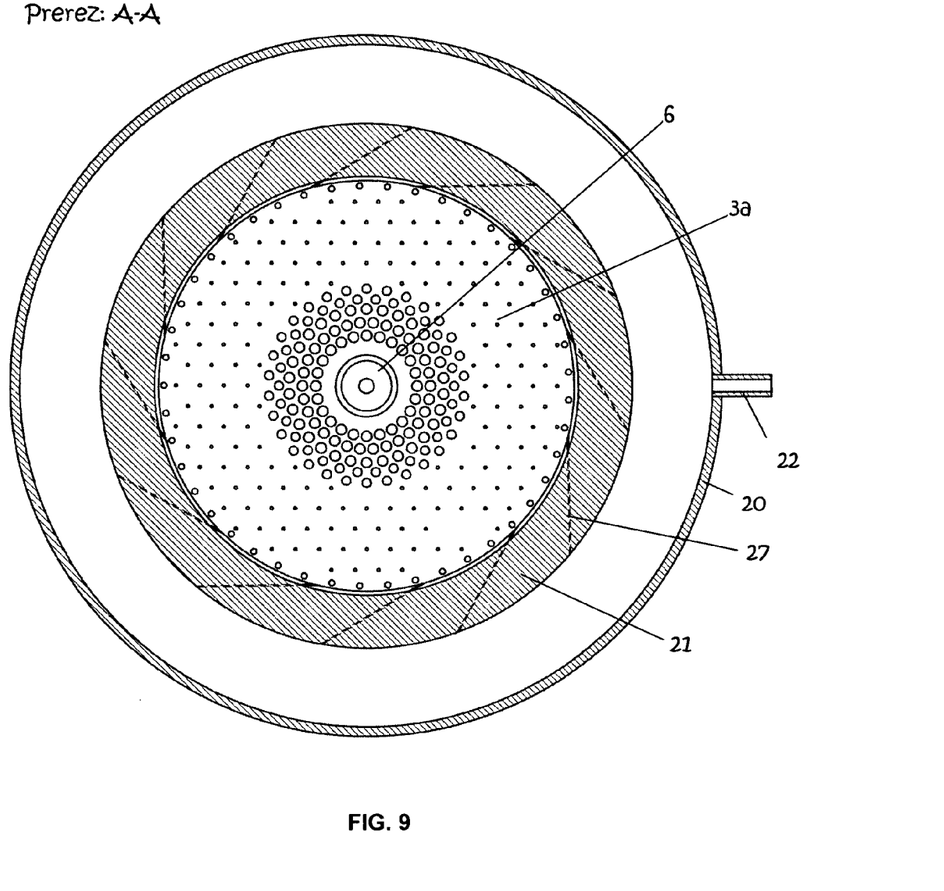
FIG. 9 A detail of the inflow structure with vertical slots.

The details of the inflow structure with vertical slots (27) are shown in FIG. 9. The inflow slots (27) are oriented under an acute angle to the tangent of wall (1) of the device or tangentially to the outer wall of the draft tube (5). The slots (27) are mounted in removable ring (21) so that by changing the rings we can correct the orientation angle of inflow. The slots (27) are powered by pressure from a common ring (20) with the connection (22) for compressed air. With the powering pressure we influence the flow of air through the slots and thus the functionality of the inflow. The circumferential inflow slot (24) (FIG. 8) is pressure powered through the ring (23) with the pressure connector (25). The pressure supply and flow regulation on the vertical slots (27) and circumferential slot (24) is implemented separately. The orientation angle of the vertical slots (27) (10° to 40° to the tangent of the outer wall (1) of the device) is selected so as not to influence the hydrodynamic conditions within the draft tube (5) and is not greater than the angle whose arm forms a tangent with the wall of the draft tube (5), otherwise, with the inflow through slots (27) we could translate the particle stream into an unstable slug flow. The peripheral slot (24) is directed radially, and because of its height (20 mm above the perforated plate (3a)) is oriented to the outer wall of the draft tube (5) so as not to disturb the particle flow within the draft tube.

By using the air inflow through the vertical slots (27) and peripheral slots (24) we can significantly lower the RSD of particle film coating thickness (implementation example 2) in a manner by minimizing the impact of the 'dead spot' effect and to horizontally mix the particles before sucking them into the draft tube.

IMPLEMENTATION EXAMPLE

For the implementation example 1 and 2 we coated 1 kg of pellets with the dye tartrazine, and during the coating experiment we sprayed 915 g 8% (m/m) of aqueous dispersion HPMC with 10.9% (m/m) part of the colouring agent. At the end of the coating, we sampled 30 samples of pellets, each containing 10 pellets and dissolved them in a phosphate buffer with pH=6.5 and measured spectrophotometrically the concentration of dye at a wavelength of 425 nm. From the population of dye concentration measurements we have calculated the relative standard deviation of the film coating thickness, as with a narrow and defined distribution of round shaped pellets the variation of concentration of dissolved dye is above all a function of the film coating thickness of pellets before dissolving. In calculating the RSD of the film coating thickness between individual pellets, we have used the methods and equations given in Cheng X X, Turton R, The Prediction of Variability occurring in Fluidized Bed Coating Equipment. II. The Role of Particle Nonuniforme Coverage Rates and a Bottom-Spray Fluidized Bed Coater. Pharm Dev. Tech., 5, 2000, 323-332.

Implementation Example 1

We carried out three coating experiments of 1000 g of pellets, with a fraction size from 710 to 800 microns according to the procedural scheme set out in Table 1. We performed the coating in a conventional Wurster chamber and in a Wurster chamber with a swirl flow generator (4).

TABLE 1

Process variables of the film coating procedure

| | temperature | | spraying | | |
|---|---|---|---|---|---|
| process | inlet [° C.] | product [° C.] | pressure [bar] | pump [RPM] | rate [g/min] |
| preheating | 55 | / | / | / | / |
| tempering | 55 | 45 | / | / | / |
| spraying | 55 | 40-46 | 2.0 | 8 | ~10.5 |
| drying | 70 | 40-54 | / | / | / |
| sampling | 70 | 55 | / | / | / |
| stop | | 61-63 | | | |

Fluidizing airflow was set to 130.4 m3/h.

TABLE 2

Results of determining the RSD film coating thickness per coating experiment

| Device type | Draft tube height [mm] | RSD of coating thickness [%] |
|---|---|---|
| conventional Wurster chamber | 20 | 21.1 |
| Wurster with swirl flow generator | 10 | 8.05 |
| Wurster with swirl flow generator | 20 | 9.28 |

It is clear from the results that by using a process device with a swirl flow generator we achieved 56 to 62% reduction of the RSD film coating thickness with regard to the conventional Wurster chamber.

Implementation Example 2

We carried out four coating experiments of 1000 g of pellets, with a fraction size from 800 to 1000 microns according to the procedural scheme set out in Table 1. We performed the coating in a conventional Wurster chamber and in a Wurster chamber with a pressure powered inflow with vertical slots (27) and the optional circumferential slot (24) in the outer wall of the device.

Fluidizing airflow was set to 130.4 m3/h. The angle of the vertical slots to the tangent of the outer wall of the Wurster device was 32°. The height of the draft tube (5) (the size of the gap between the tube and the distribution plate) was set to 10 mm.

TABLE 3

Results of determining the RSD film coating thickness per coating experiment

| Device type | Powering pressure on slot 27 [mbar] | Powering pressure on slot 24 [mbar] | RSD of coating thickness [%] |
|---|---|---|---|
| conventional Wurster chamber | / | / | 20.5 |
| Wurster with inflow from below (27) | 100 | / | 11.0 |
| Wurster with inflow from below (27) | 80 | / | 18.1 |
| Wurster with inflow from below (27) and (24) | 80 | 79 | 11.7 |

It is clear from the results in Table 3 that by using the inflow slots (27), we reduce the RSD film coating thickness up to 46% when compared to a conventional Wurster chamber. By using the inflow slots (27) and (24) we have achieved a significant reduction in RSD film coating thickness when compared to the experiment where we only used inflow slots (27).

Implementation Example 3

The fraction of agglomerated phases after experiments of coating pellets with an initial size of 800 to 1000 microns has been determined by sifting the pellets through a sieve 1.200 mm, in which the clusters of agglomerated pellets were left behind on the used sieve, while individual coated pellets passed through the sieve unimpeded. We divided the mass of the remaining agglomerated pellets on the sieve by the mass of the entire series of coated pellets before sifting. In this way we calculated the fraction of the agglomerated phase of the coating procedure, which we expressed in percentage terms.

We calculated the coating yield by dividing the actual increment in mass of the pellets during coating by a theoretically calculated mass of dispersion dry material, which was sprayed during the coating.

We performed the pellet coating experiment with 8% (m/m) of aqueous solution HPMC with the addition of dye where we used the process parameters listed in Table 4. We coated 1000 g of pellets (800 to 1000 microns) with 986 g of coating dispersion.

Fluidizing airflow was set to 130.4 m3/h at relative humidity of inlet air at 38 to 39% (humidity measured at 18° C.). The height of the draft tube (5) (the size of the gap between the draft tube and the distribution plate) was set to 20 mm.

From the results in Table 5 it is clear that the use of the swirl flow generator (4) reduces the fraction of agglomerated phase by 57.5% against the fraction of agglomerated phase obtained by a conventional Wurster chamber. It is also shown in Table 5 that using a swirl flow generator (4) improves coating yield.

TABLE 4

Process variables of the film coating procedure

| | temperature | | spraying | | |
| process | inlet [° C.] | product [° C.] | pressure [bar] | pump [RPM] | rate [g/min] |
|---|---|---|---|---|---|
| preheating | 56 | / | / | / | / |
| tempering | 56 | 45 | / | / | / |
| spraying | 56 | 40-46 | 2.0 | 14 | ~13.3 |
| drying | 70 | 40-54 | / | / | / |

TABLE 5

Results of determining the fraction of agglomerated phase and coating yield

| device type | agglomeration fraction [%] | coating yield [%] |
|---|---|---|
| conventional Wurster chamber | 27.8 | 76.91 |
| Wurster with swirl flow generator (4) | 11.8 | 80.25 |

Implementation Example 4

The coating of pellets sized from 200 to 355 microns was performed in a conventional Wurster chamber and the chamber with a swirl flow generator (4). The fraction of agglomerated phases following pellet coating experiments was determined by sifting the coated pellets through a sieve 0.500 mm, in which the clusters of agglomerated pellets were left behind on the used sieve, while individual coated pellets passed through the sieve unimpeded. We divided the mass of the remaining agglomerated pellets in the sieve by the mass of the entire series of coated pellets before sifting. We calculated the coating yield in the same way as in implementation example 3.

We performed the pellet coating experiment with 8% (m/m) of aqueous solution HPMC with the addition of dye where we used the process parameters listed in Table 6. We coated 1000 g of pellets (200 to 355 microns) with 986 g of coating dispersion. Fluidizing airflow was set to 105 m3/h at relative humidity of inlet air at 39% (humidity measured at 18° C.). The height of the draft tube (5) (the size of the gap between the draft tube and the distribution plate) was set to 10 mm.

From the results in Table 7 it is clear that the use of the swirl flow generator (4) reduces the fraction of agglomerated phase when compared with a conventional Wurster chamber, also in the case of coating small particles (200-300 microns), which indicates better thermal efficiency of the new device. The coating yield for both processing chambers is comparable.

TABLE 6

Process variables of the film coating procedure

| process | temperature | | spraying | | |
| --- | --- | --- | --- | --- | --- |
| | inlet [° C.] | product [° C.] | pressure [bar] | pump [RPM] | rate [g/min] |
| prehetaing | 56 | / | / | / | / |
| tempering | 56 | 45 | / | / | / |
| spraying | 56 | 40-46 | 2.0 | 10 | ~9.5 |
| drying | 70 | 40-54 | / | / | / |

TABLE 7

Results of determining the fraction of agglomerated phase and coating yield

| device type | agglomeration fraction [%] | coating yield [%] |
| --- | --- | --- |
| conventional Wurster chamber | 70.7 | 56.3 |
| Wurster with swirl flow generator (4) | 43.6 | 57.7 |

Implementation Example 5

Fraction pellet interval size from 500 to 700 microns and interval size from 800 to 1000 microns were mixed in weight ratio 1:1. We performed two experiments of coating pellets using a polymer solution HPMC, which contains 10.9% of tartrazine dye. The coating process was carried out with a conventional Wurster chamber and a chamber with a swirl flow generator (4).

We performed the pellet coating experiment with 8% (m/m) of aqueous solution HPMC with the addition of dye where we used the process parameters listed in Table 8. We coated 1000 g of pellets of the above-mentioned mixture with 975 g of coating dispersion.

Fluidizing airflow was set to 130.4 m3/h at relative humidity of inlet air at 38% (humidity measured at 18° C.). The height of the draft tube (5) (the size of the gap between the draft tube and the distribution plate) was set to 20 mm.

After completing both coatings, we used a 0.800 mm sieve to sift the coated pellets into two basic size fractions. From each size fraction, we randomly sampled 12 samples of 10 pellets each and spectrophotometrically determined the concentration of dye for the samples of both size fractions. We calculated the average value of dye concentration for both size fractions. With the correction factor, based on the area ratio of the initial size of the pellets of both size fractions, we multiplied the average concentration of dye measured for the smaller size fraction of pellets, and so achieved that the concentration of dye represents a comparable average coat thickness in individual size fractions of pellets. We compared the difference between the average values of dye concentrations for both fractions of pellets after coating, for both coating with a conventional Wurster chamber and a chamber with a swirl flow generator (4).

TABLE 8

Process variables of the film coating procedure

| process | temperature | | spraying | | |
| --- | --- | --- | --- | --- | --- |
| | inlet [° C.] | product [° C.] | pressure [bar] | pump [RPM] | rate [g/min] |
| prehetaing | 55 | / | / | / | / |
| tempering | 55 | 45 | / | / | / |
| spraying | 55 | 41 | 2.0 | 10 | ~9.3 |
| drying | 60 | 48-49 | / | / | / |

TABLE 9

Results of determining the average concentration of dye with corrections in respect to the surface area of each pellet sample

| Fraction size of pellet | conventional Wurster chamber Dye concentration [g/mL] | Wurster with swirl flow generator Dye concentration [g/mL] |
| --- | --- | --- |
| 500-800 microns | $(3.18 \times 10^{-6} \times 2.21) = 7.03 \times 10^{-6}$ | $(3.39 \times 10^{-6} \times 2.21) = 7.49 \times 10^{-6}$ |
| 800-1000 microns | $9.40 \times 10^{-6}$ | $7.77 \times 10^{-6}$ |
| Dye concentration difference between fractions | $2.37 \times 10^{-6}$ | $0.28 \times 10^{-6}$ |

From table 9 it is clear that in the case of a conventional Wurster device, there actually exists a dependence of the thickness of the applied coating to the initial size of the pellet, which is reflected in the difference between the, on the surface normalised average concentrations of dye for each size fraction of pellets. By using a process device with a swirl flow generator (4), the difference between dye concentrations of the larger and smaller size fraction of pellets is significantly reduced. The reduced differences of the dye concentration shows that with the use of the process device with a swirl flow generator (4), the difference in the applied coating for pellets of smaller and larger size fractions has also reduced.

The invention claimed is:

1. A process device for coating particles in which on the inside wall (1), there are one or more units installed, in which each unit comprises a swirl flow generator (4) around which is located in cross-section a straight or curved perforated plate (3) and draft tube (5), where centrally through the swirl flow generator (4) a single or multi-phase spraying nozzle (6) is installed with a conduit (7) for dispersion for coating and a conduit (8) of compressed air, characterized in that, the swirl flow generator (4) has at an angle from the vertical adjacent grooves (18) that open outwards, wherein the angle of grooves (18) to the vertical line are between 10 and 45°.

2. A process device for coating particles according to the claim 1, characterized in that, the total floor area of grooves (18) of swirl flow generator (4) is from 20 to 50% of the horizontal cross section cut of the draft tube (5) and the diameter of the swirl flow generator (4) is from 65 to 100% of the diameter of the draft tube (5).

3. A process device for coating particles according to the claim 1, characterized in that, in the wall (1), at least 20 mm above the plane of the distribution plate (3) there is a radially installed circumferential inflow slot (24), and otherwise inclined with regards to the horizontal plane and which is pressure powered through a hollow ring (23) with a pressure connection (25).

4. A process device for coating particles characterized in that, it contains the structural elements of claim 1.

5. A process device for coating particles in which on the inside wall (1), there are one or more units installed, in which each unit comprises a swirl flow generator (4) around which is located in cross-section a straight or curved perforated plate (3) and draft tube (5), where centrally through the swirl flow generator (4) a single or multi-phase spraying nozzle (6) is installed with a conduit (7) for dispersion for coating and a conduit (8) of compressed air, characterized in that, the swirl flow generator (4) has at an angle from the vertical adjacent grooves (18) that open outwards and that into a ring (21) are set inflow slots (27), which are pressure powered from a common hollow ring (20) with a connection (22) for compressed air, wherein the orientation angle of the vertical slots (27) is from 10° to 40° to the tangent of the outer wall (1) of the device, but not greater than the angle whose arm forms a tangent with the wall of the draft tube (5).

6. A process device for coating particles in which on the inside wall (1), there are one or more units installed, in which each unit comprises a draft tube (5) and a single or multi-phase spraying nozzle (6), which is mounted centrally with regard to the draft tube and penetrates the perforated plate (3a), and in the wall (1) of the device a ring (21) is installed, that the perforated plate (3a), which is installed in the outer area, between the wall of the draft tube (5), and the wall (1) of the device, is in cross-section a straight or curved perforated plate (3a) and has a characteristic distribution of the size of round orifices with the largest cross sections in the area of the ground floor projection of the draft tube (5) and smaller orifices in the remaining part of the area characterized in that, into the ring (21) are installed inflow slots (27) that are pressure powered from a common hollow ring (20) with a connector (22) for compressed air, and wherein the orientation angle of the vertical slots (27) is from 10° to 40° to the tangent of the outer wall (1) of the device, but not greater than the angle whose arm forms a tangent with the wall of the draft tube (5).

7. A process device for coating particles according to the claim 6 characterized in that, in the wall (1), at least 20 mm above the plane of the distribution plate (3a) there is a radially installed circumferential inflow slot (24), and otherwise inclined with regards to the horizontal plane and which is pressure powered through a hollow ring (23) with a pressure connection (25).

* * * * *